United States Patent
Jang

(10) Patent No.: US 11,232,899 B2
(45) Date of Patent: Jan. 25, 2022

(54) MAGNETIC SHIELDING SHEET AND WIRELESS POWER TRANSFER MODULE INCLUDING THE SAME

(71) Applicant: VIRGINIA WIRELESS AND STREAMING TECHNOLOGIES LLC, Ashburn, VA (US)

(72) Inventor: Kil Jae Jang, Seongnam-si (KR)

(73) Assignee: VIRGINIA WIRELESS AND STREAMING TECHNOLOGIES LLC, Ashburn, VA (US)

( * ) Notice: Subject to any disclaimer, the term of this patent is extended or adjusted under 35 U.S.C. 154(b) by 0 days.

(21) Appl. No.: 16/643,023

(22) PCT Filed: Sep. 13, 2018

(86) PCT No.: PCT/KR2018/010770
§ 371 (c)(1),
(2) Date: Feb. 28, 2020

(87) PCT Pub. No.: WO2019/054777
PCT Pub. Date: Mar. 21, 2019

(65) Prior Publication Data
US 2020/0194169 A1 Jun. 18, 2020

(30) Foreign Application Priority Data

Sep. 18, 2017 (KR) .......... 10-2017-0119472

(51) Int. Cl.
*H01F 27/36* (2006.01)
*H02J 50/12* (2016.01)
*H02J 50/70* (2016.01)
*H01F 38/14* (2006.01)

(52) U.S. Cl.
CPC ............. *H01F 27/36* (2013.01); *H01F 38/14* (2013.01); *H02J 50/12* (2016.02); *H02J 50/70* (2016.02)

(58) Field of Classification Search
None
See application file for complete search history.

(56) References Cited

U.S. PATENT DOCUMENTS

| 9,252,611 | B2* | 2/2016 | Lee | ............... H05K 9/0081 |
| 9,397,505 | B2* | 7/2016 | Lee | ............... H02J 50/80 |
| 10,930,431 | B2* | 2/2021 | Ngahu | ............... H01F 38/14 |
| 2011/0050164 | A1* | 3/2011 | Partovi | ............... H02J 7/00304 320/108 |

(Continued)

FOREIGN PATENT DOCUMENTS

| KR | 10-1656260 B | 9/2016 |
| KR | 10-2016-0135678 A | 11/2016 |

(Continued)

Primary Examiner — Lincoln D Donovan
Assistant Examiner — Khareem E Almo
(74) Attorney, Agent, or Firm — Capitol IP Law Group, PLLC

(57) ABSTRACT

A magnetic shielding sheet is provided. The magnetic shielding sheet according to an embodiment of the present invention comprises: a plate-shaped magnetic sheet made of a magnetic material containing a metal component; and a cover member for covering the entire surface of the magnetic sheet so as to prevent the surface of the magnetic sheet from being exposed to the outside.

14 Claims, 5 Drawing Sheets

(56) References Cited

U.S. PATENT DOCUMENTS

| | | | | |
|---|---|---|---|---|
| 2014/0049212 A1* | 2/2014 | Sawa | ................... | H02J 50/70 |
| | | | | 320/108 |
| 2015/0236545 A1* | 8/2015 | Hyun | ................ | H01F 41/046 |
| | | | | 320/108 |
| 2015/0255993 A1* | 9/2015 | Kuerschner | ............ | H02J 5/005 |
| | | | | 307/104 |
| 2016/0156103 A1* | 6/2016 | Bae | .................. | H02J 7/025 |
| | | | | 320/108 |
| 2016/0254707 A1* | 9/2016 | Fujiwara | ............. | H02J 50/12 |
| | | | | 307/104 |
| 2017/0345555 A1* | 11/2017 | Jang | .................. | H02J 50/10 |
| 2018/0177075 A1* | 6/2018 | Kweon | ............... | H01F 38/14 |
| 2018/0198305 A1* | 7/2018 | Hwang | ................ | H02J 7/02 |
| 2018/0219400 A1* | 8/2018 | Jin | .................. | H02J 7/025 |
| 2018/0240582 A1* | 8/2018 | Cho | ................ | H01F 1/15358 |
| 2018/0286550 A1* | 10/2018 | Nakahata | ............... | H01F 38/14 |
| 2019/0044391 A1* | 2/2019 | Jang | ................ | H04B 5/0081 |
| 2019/0114526 A1* | 4/2019 | Finn | .................. | H01Q 21/29 |
| 2019/0362887 A1* | 11/2019 | Yang | ................ | H01F 27/292 |
| 2020/0328025 A1* | 10/2020 | Faraji | ................ | H01F 27/22 |

FOREIGN PATENT DOCUMENTS

| | | | |
|---|---|---|---|
| KR | 10-2017-0050665 A | 5/2017 | |
| KR | 10-2017-0062394 A | 6/2017 | |
| KR | 10-2017-0067635 A | 6/2017 | |

* cited by examiner

MAGNETIC SHIELDING SHEET AND WIRELESS POWER TRANSFER MODULE INCLUDING THE SAME

CROSS-REFERENCE TO RELATED APPLICATION

This application is the national phase entry of International Application No. PCT/KR2018/010770, filed on Sep. 13, 2018, which is based upon and claims priority to Korean Patent Applications 10-2017-0119472, filed on Sep. 18, 2017, the entire contents of which are incorporated herein by reference.

TECHNICAL FIELD

The present invention relates to wireless power transmission, and more particularly, to a magnetic shielding sheet and a wireless power transfer module including the same.

BACKGROUND

Recently, portable terminals such as mobile phones and tablet personal computers (PCs) include a wireless charging function capable of wirelessly charging a built-in battery.

Such wireless charging is performed by a wireless power reception module embedded in the portable terminal and a wireless power transmitting module configured to supply power to the wireless power reception module.

That is, power for charging a battery is produced by a wireless power receiving antenna receiving power transmitted from a wireless power transmitting antenna.

Such a wireless power transmitting method uses a magnetic field, and a magnetic shielding sheet is used to prevent wireless charging performance from being degraded.

The magnetic shielding sheet is usually manufactured through a punching process. Accordingly, the magnetic shielding sheet manufactured through the punching process has a side surface formed as a punched surface. Here, in a case in which a magnetic sheet constituting the magnetic shielding sheet includes a metal component, when the magnetic shielding sheet is used in a product in a state in which the side surface that is the punched surface is externally exposed, the following problems occur.

That is, in the magnetic shielding sheet, fine pieces or particles such as powder particles may be separated from the externally exposed punched surface. In this case, the particles separated from the punched surface include a conductive metal component like the magnetic sheet. Accordingly, when the particles separated from the punched surface come into contact with an electronic circuit positioned in the surroundings of the magnetic shielding sheet, the metal component of the particles may cause a short circuit of the electronic circuit.

In addition, the above-described magnetic shielding sheet also has a problem in that the punched surface, which is the exposed surface, is oxidized through contact with moisture in a salt spray test process for a reliability test.

SUMMARY OF THE INVENTION

The present invention is directed to providing a magnetic shielding sheet capable of fundamentally preventing separation or oxidation of particles through an exposed surface, and a wireless power transfer module including the same.

According to one embodiment of the present invention, a magnetic shielding sheet includes a magnetic sheet having a plate shape and made of a magnetic material including a metal component, and a cover member configured to cover an entire surface of the magnetic sheet to prevent the surface of the magnetic sheet from being externally exposed.

The cover member may be a protective film. The cover member may include a first cover member configured to cover an upper surface and side surfaces of the magnetic sheet and a second cover member configured to cover a lower surface of the magnetic sheet.

The magnetic sheet may be a thin ribbon sheet including at least one selected from an amorphous alloy and a nanocrystalline alloy. The magnetic sheet may be a multilayer sheet in which a plurality of ribbon sheets are stacked as multiple layers through an adhesive layer.

The magnetic sheet may be a sheet which is flake-treated and divided into a plurality of fine pieces. The plurality of fine pieces may include fine pieces having at least one side formed in a curved shape rather than a straight line.

The number of the fine pieces having the at least one side formed in the curved shape may be 50% or more of the total number of the plurality of fine pieces. Preferably, the number of the fine pieces having the at least one side formed in the curved shape may be 70% or more of the total number of the plurality of fine pieces.

According to one embodiment of the present invention, a wireless power transfer module includes an antenna unit including at least one wireless power transfer antenna for wireless power transmission; and the magnetic shielding sheet attached to one surface of the antenna unit through an adhesive layer so as to shield a magnetic field generated in the antenna unit.

The wireless power transfer antenna may be an antenna pattern patterned on at least one surface of a circuit board.

The magnetic shielding sheet may have a size that is relatively greater than that of the circuit board.

The wireless power transfer module may be a wireless power reception module embedded in a portable terminal.

According to the present invention, all surfaces of a magnetic sheet constituting a magnetic shielding sheet are covered by a cover member, thereby preventing the magnetic sheet from being oxidized through being in contact with air and/or moisture and fundamentally preventing particles from being separated from the magnetic sheet. Accordingly, reliability of a product can be improved.

DETAILED DESCRIPTION OF THE INVENTION

Figure 1:
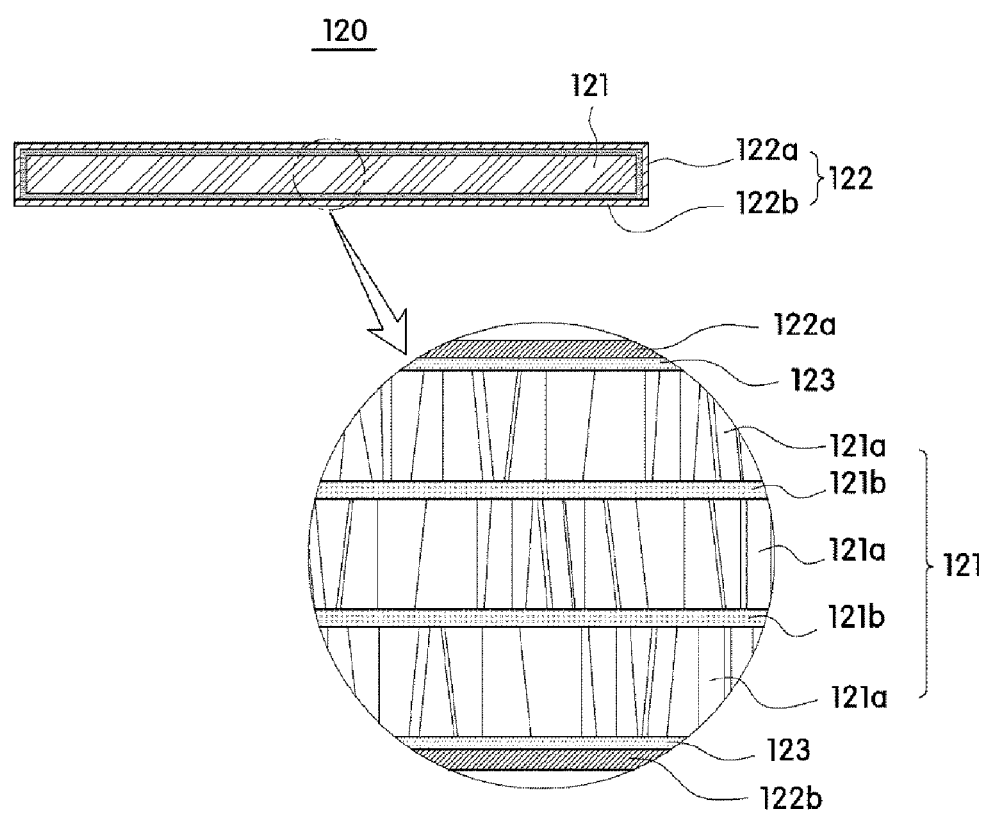
FIG. 1 is a cross-sectional view illustrating a magnetic shielding sheet according to one embodiment of the present invention.

Hereinafter, embodiments of the present invention will be described in detail with reference to the accompanying drawings so as to be easily practiced by a person of ordinary skill in the art. It should be understood that the present invention may be embodied in various different forms and is not limited to the following embodiments. Parts irrelevant to description are omitted in the drawings in order to clearly explain the present invention, and like reference numerals refer to like elements throughout the specification.

Figure 2:
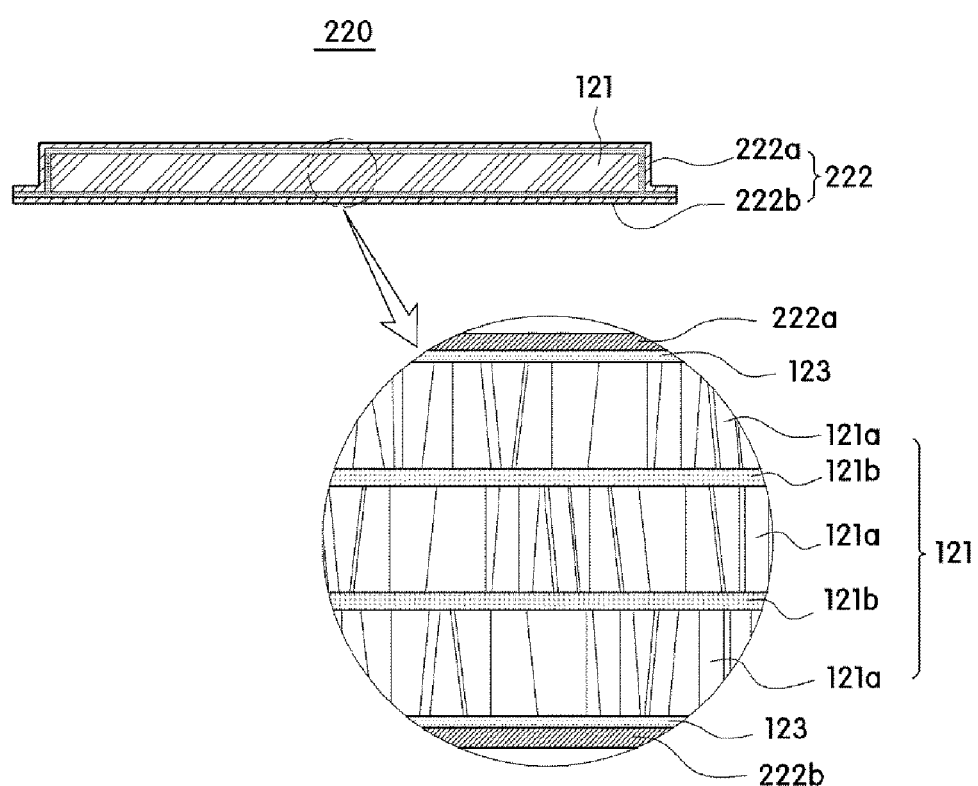
FIGS. 2 and 3 are cross-sectional views illustrating modified examples of FIG. 1.
Figure 3:
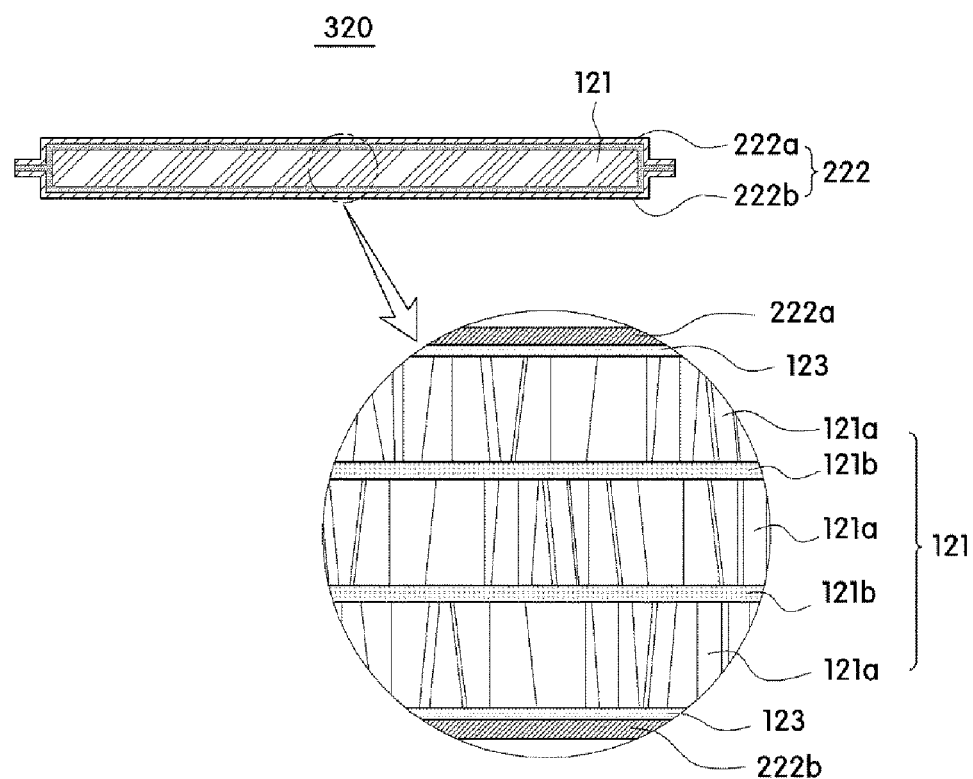

As shown in FIGS. 1 to 3, a magnetic shielding sheet 120, 220, or 320 according to one embodiment of the present invention may include a magnetic sheet 121 and a cover member 122 or 222. In this case, all surfaces of the magnetic sheet 121 may be covered by the cover member 122 or 222 and thus may be prevented from being externally exposed.

The magnetic sheet 121 may shield a magnetic field generated in an antenna to increase performance of the antenna.

To this end, the magnetic sheet 121 may be a plate-shaped sheet having a certain area and may be made of a magnetic material to shield a magnetic field.

In addition, the magnetic sheet 121 may be a single layer sheet or may be a multilayer sheet in which a plurality of sheets 121*a* are stacked as multiple layers through adhesive layers 121*b*.

Here, the magnetic sheet 121 may be flake-treated and formed to be divided into a plurality of fine pieces. In this case, the magnetic sheet 121 may be formed to be divided into the plurality of fine pieces so that the sheet itself may have flexibility. Accordingly, the magnetic sheet 121 may be prevented from being cracked and damaged by an external impact, thereby minimizing or preventing a change in initial characteristic value thereof.

In addition, when the magnetic sheet 121 is formed to be divided into the plurality of fine pieces, overall resistance thereof may be increased, and thus, the magnetic sheet 121 may suppress generation of an eddy current. Therefore, a quality factor (Q) value of an antenna 114 may be increased.

Here, each of the fine pieces may be randomly formed to have an irregular shape.

Meanwhile, when the magnetic sheet 121 is a multilayer sheet in which the plurality of sheets 121*a* divided into fine pieces are stacked as multiple layers, the adhesive layer 121*b* including a non-conductive material may be disposed between the sheets 121*a*. Here, the adhesive layer 121*b* may be a liquid or gel adhesive or may be a layer in which an adhesive is applied on both surfaces of a substrate.

Accordingly, an adhesive constituting the adhesive layer 121*b* may partially or entirely permeate into two sheets 121*a* stacked on each other and may be disposed between adjacent fine pieces. Accordingly, the plurality of fine pieces constituting each sheet 121*a* may be insulated from each other through the adhesive.

Figure 4:
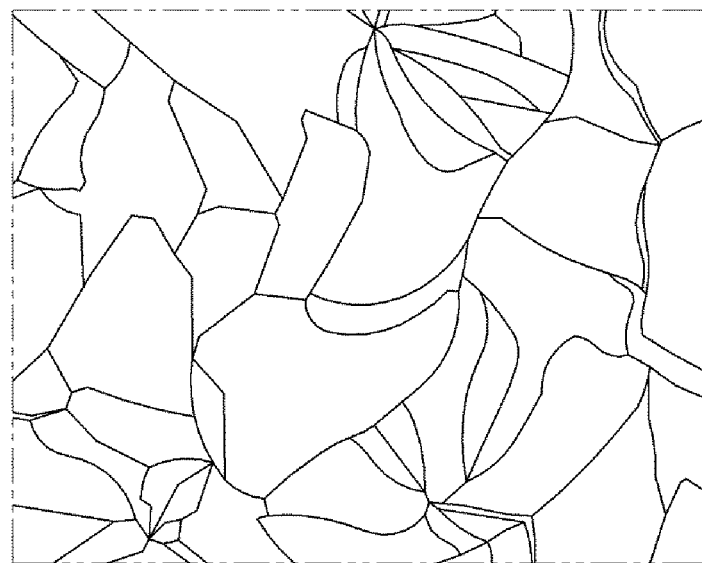
FIG. 4 is a schematic view illustrating shapes of fine pieces when a magnetic sheet applied to the magnetic shielding sheet according to one embodiment of the present invention is formed to be divided into a plurality of fine pieces.

Meanwhile, when the magnetic sheet 121 is flake-treated and formed to be divided into the plurality of fine pieces, as shown in FIG. 4, the plurality of fine pieces may include fine pieces having at least one side formed in a curved shape rather than a straight line. In this case, among the total number of the fine pieces constituting each sheet 121*a*, the ratio of the fine pieces having at least one side formed in a curved shape may be 50% or more and preferably 70% or more of the total number of the fine pieces constituting the sheet 121*a*.

Here, when the sheet 121*a* formed to be divided into the plurality of fine pieces includes the fine pieces, of which at least one side is formed in a curved shape, in a certain ratio, flexibility of the sheet 121*a* itself may be further improved.

Therefore, even when the magnetic sheet 121 is bent or warped by an external force during use or transportation thereof, each of the fine pieces constituting the sheet may be prevented from being additionally broken, or the sheet may be prevented from being cracked because the sheet itself may have more excellent flexibility. As a result, the magnetic shielding sheet 120, 220, or 320 according to one embodiment of the present invention may always maintain a design value equivalent to an initial design value of the sheet itself.

This can be confirmed through Table 1 below.

That is, when a sheet is formed to be divided into a plurality of fine pieces, Table 1 below shows results of testing flexibility of the sheet according to a ratio of the number of fine pieces having at least one side formed in a curved shape to the total number of all fine pieces constituting the sheet.

When the sheet is bent 100 times at an angle of 30° with respect to a horizontal plane, Table 1 shows results of measuring an average number of the fine particles making a surface of the cover member 122 or 222 to protrude due to corners of the fine particles pressing the cover member 122 or 222. When the average number of the fine pieces making the surface of the cover member 122 or 222 to protrude was 10 or more, the sheet was classified as a defective product (X), and when the average number of the fine pieces making the surface of the cover member 122 or 222 to protrude was less than 10, the sheet was classified as a passing product (O).

TABLE 1

An average number of fine pieces protruding due to pressing the cover member when a sheet is bent 100 times at an angle of 30° with respect to a horizontal surface

| Classification | Comparative Example 1 | Example 1 | Example 2 |
| --- | --- | --- | --- |
| Ratio of the number of fine pieces having at least one side formed in curved shape to the total number of fine pieces | 30% | 50% | 70% |
| Average number of fine pieces protruding due to pressing cover member | 20 | 9 | 3 |
| Defective product | X | ◯ | ◯ |

As can be confirmed in Table 1 above, when a ratio of the number of the fine pieces having at least one side formed in a curved shape to the total number of all fine pieces constituting the sheet is less than 50% (Comparative Example 1), it can be confirmed that the average number of the fine pieces protruding toward the cover member 122 or 122 is 10 or more.

In addition, when a ratio of the number of the fine pieces having at least one side formed in a curved shape to the total number of all fine pieces constituting the sheet is more than or equal to 50% (Examples 1 and 2), it can be confirmed that the average number of the fine pieces protruding toward the cover member is less than 10.

Thus, when the sheet is bent 100 times at an angle of 30° with respect to a horizontal plane, a small average number of fine pieces pressing the cover member may mean that flexibility of the sheet itself is improved. In other words, excellent flexibility of the sheet may mean that, even when the sheet itself is bent or warped, a possibility of damage to each of the fine pieces constituting the sheet may be reduced. That is, even when the sheet itself is bent or warped during use thereof, a change in characteristic value of the sheet itself may mean that the change is insignificant when compared with an initial characteristic value of the sheet.

As a non-limiting example, the magnetic sheet 121 may be a ribbon sheet including at least one selected from an amorphous alloy and a nano-crystalline alloy. Here, the amorphous alloy or nano-crystalline alloy may use an iron (Fe)-based or cobalt (Co)-based magnetic alloy and may include a three-element alloy and a five-element alloy. For example, the three-element alloy may include Fe, silicon (Si), and boron (B), and the five-element alloy may include Fe, Si, B, copper (Cu), and niobium (Nb).

In addition, as shown in FIGS. 1 to 3, the magnetic sheet 121 may be a multilayer sheet in which a plurality of ribbon sheets 121*a* are stacked as multiple layers using the adhesive layers 121*b*. Each ribbon sheet 121*a* constituting the multilayer sheet may be flake-treated and formed to be divided into a plurality of fine pieces, and each of the fine pieces may be randomly formed to have an irregular shape.

In this case, the adhesive layer 121*b* may include a non-conductive component, and at least a portion thereof may permeate into two ribbon sheets 121*a* stacked through the adhesive layer 121*b*.

Thus, among the plurality of fine pieces constituting each ribbon sheet 121*a*, adjacent fine pieces may be insulated from each other through the non-conductive component included in the adhesive layer 121*b*.

The cover member 122 or 222 may be attached to cover all surfaces of the magnetic sheet 121 through an adhesive layer 123 to prevent the magnetic sheet 121 from being externally exposed.

Thus, the magnetic shielding sheet 120, 220, or 320 according to one embodiment of the present invention may fundamentally block all the surfaces of the magnetic sheet 121 from coming into contact with moisture and the like through the cover member 122 or 222. Even when particles, fine pieces, or the like are separated from the magnetic sheet 121, the particles, fine pieces, or the like may be prevented from externally deviating.

Accordingly, even when the magnetic sheet 121 is made of a magnetic material including a metal component, the magnetic shielding sheet 120, 220, or 320 according to one embodiment of the present invention may block the magnetic sheet 121 from coming into contact with moisture or the like, or fundamentally blocking particles or fine pieces separated from the magnetic sheet 121 from externally deviating.

Thus, the magnetic shielding sheet 120, 220, or 320 according to one embodiment of the present invention may prevent the magnetic sheet 121 from being oxidized by moisture or the like and may prevent particles or fine pieces from externally deviating to be short-circuited with an electronic circuit.

As a result, the magnetic shielding sheet 120, 220, or 320 according to one embodiment of the present invention may increase reliability of a product.

In the present invention, the cover member 122 or 222 may be a member on which a liquid or gel coating solution is applied to all the surfaces of the magnetic sheet 121 through dipping, spraying, printing, or the like. However, for a convenience of a manufacturing process, the cover member 122 or 222 may be a protective film having a sheet shape. In addition, a fluorine resin-based film such as a polyethylene terephthalate (PET) film, a polypropylene (PP) film, or a polyterephthalate (PTFE) film may be used as the protective film.

Meanwhile, as shown in FIGS. 1 to 3, the cover members 122 and 222 may include first cover members 122*a* and 222*a* and second cover members 122*b* and 222*b*. All the surfaces of the magnetic sheet 121 may be covered by the first cover member 122*a* or 222*a* and the second cover member 122*b* or 222*b*.

In this case, the adhesive layer 123 may be disposed on one surface of the first cover member 122*a* or 222*a* and the second cover member 122*b* or 222*b*, and the first cover member 122*a* or 222*a* and the second cover member 122*b* or 222*b* may be attached to the magnetic sheet 121 through the adhesive layer 123.

As a specific example, the first cover member 122*a* or 222*a* may be attached to upper and side surfaces of the magnetic sheet 121 through the adhesive layer 123. Thus, the first cover member 122*a* or 222*a* may cover the upper and side surfaces of the magnetic sheet 121.

In addition, the second cover member 122*b* or 222*b* may be attached to a lower surface of the magnetic sheet 121 through the adhesive layer 123. Thus, the second cover member 122*b* or 222*b* may cover the lower surface of the magnetic sheet 121.

In this case, as shown in FIG. 1, in the cover member 122, the first cover member 122*a* may have an area corresponding to an area obtained by adding up surface areas of the upper and side surfaces of the magnetic sheet 121. In addition, the second cover member 122*b* may have an area corresponding to a surface area of the lower surface of the magnetic sheet 121.

As another example, as shown in FIG. 2, in the cover member 222, the first cover member 222*a* may have an area that is relatively wider than an area obtained by adding up the surface areas of the upper and side surfaces of the magnetic sheet 121. In addition, the second cover member 222*b* may have an area that is relatively wider than the surface area of the lower surface of the magnetic sheet 121.

Thus, when the first cover member 222*a* and the second cover member 222*b* are attached to the magnetic sheet 121 through the adhesive layer 123, a portion of the first cover member 222*a* may be attached directly to a portion of the second cover member 222*b* through the adhesive layer 123.

Accordingly, even when the first cover member 222*a* attached directly to each of the upper and side surfaces of the magnetic sheet 121 and the second cover member 222*b* attached directly to the lower surface of the magnetic sheet 121 are partially separated from the magnetic sheet 121, a sealing state may be maintained through a portion of the first cover member 222*a* and a portion of the second cover member 222*b* which are attached directly to each other through the adhesive layer 123.

As a result, the magnetic shielding sheet 220 according to the present embodiment may fundamentally prevent fine pieces or particles separated or detached from the magnetic sheet 121 from externally deviating.

As still another example, as shown in FIG. 3, in the cover member 222, the first cover member 222*a* and the second cover member 222*b* may have the same area and size.

In this case, the first cover member 222*a* and the second cover member 222*b* may have an area that is relatively wider than the surface area of the upper or lower surface of the magnetic sheet 121.

Accordingly, edges of the first cover member 222*a* and the second cover member 222*b* may be attached directly to each other through the adhesive layer 123 which is similar to a shape of FIG. 2. In addition, a portion of each of the first cover member 222*a* and the second cover member 222*b* may be attached to the side surfaces of the magnetic sheet 121.

Thus, even when the first cover member 222*a* attached directly to each of the upper and side surfaces of the magnetic sheet 121 and the second cover member 222*b* attached directly to each of the lower and side surfaces of the magnetic sheet 121 are partially separated from the magnetic sheet 121, a sealing state may be maintained through a portion of the first cover member 222a and a portion of the second cover member 222b which are attached directly to each other through the adhesive layer 123.

As a result, the magnetic shielding sheet 320 according to the present embodiment may fundamentally prevent fine pieces or particles separated or detached from the magnetic sheet 121 from externally deviating.

However, shapes of the cover members 122 and 222 of the present invention are not limited thereto. As long as the cover members 122 and 222 have shapes which surround all surfaces of the magnetic sheet 121, areas of the first cover members 122a and 222a and the second cover members 122b and 222b may be appropriately changed.

Figure 5:
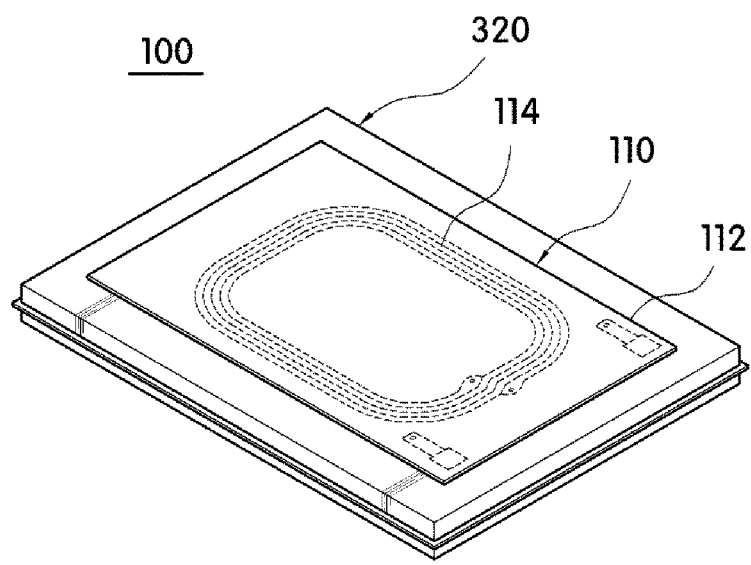
FIG. 5 is a schematic view illustrating a wireless power transfer module according to one embodiment of the present invention.
Figure 6:
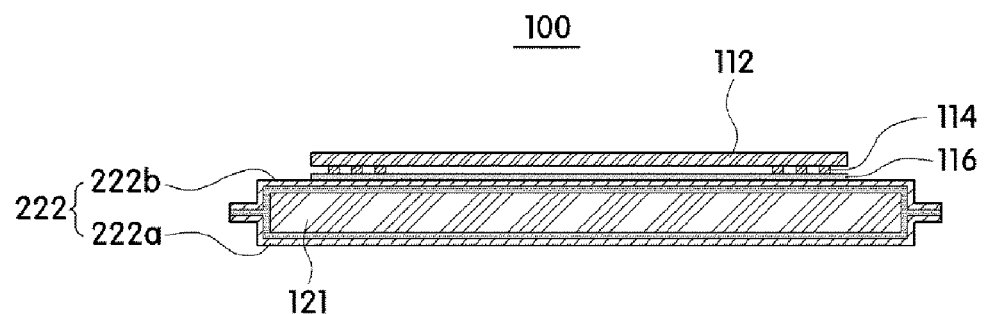
FIG. 6 is a cross-sectional view of FIG. 5.

Meanwhile, the above-described magnetic shielding sheet 120, 220, and 320 may be applied to a wireless power transfer module 100. As an example, as shown in FIGS. 4 and 5, the wireless power transfer module 100 may include an antenna unit 110 and the magnetic shielding sheet 120, 220, or 320.

The antenna unit 110 may include at least one antenna using a certain frequency band and may perform a certain function using the frequency band.

The antenna unit 110 may include at least one wireless power transfer antenna 114, and the antenna unit 110 may be fixed to one surface of the magnetic shielding sheet 120, 220, or 320 through an adhesive layer 116.

Here, the wireless power transfer antenna 114 may be an antenna pattern having a loop shape formed by patterning a conductor such as a copper foil or formed by using a conductive ink on at least one surface of a circuit board 112 made of a synthetic resin such as polyimide (PI) or PET.

Alternatively, the wireless power transfer antenna 114 may be formed of a plate-shaped coil having a circular, elliptical, or rectangular shape, in which a conductive member having a certain length is wound a plurality of times in a clockwise or counterclockwise direction. The plate-shaped coil may be fixed to one surface of the magnetic shielding sheet 120, 220, or 320.

In addition, the wireless power transfer antenna 114 may be operated as a transmitting coil (Tx coil) for transmitting a wireless power signal or may be operated as a receiving coil (Rx coil: second coil) for receiving a wireless power signal to produce power required by a portable electronic device. In addition, the wireless power transfer antenna 114 may be operated in a magnetic induction method or may be operated in a magnetic resonance method.

In this case, the circuit board 112 may have an area that is substantially the same as an area of one surface of the magnetic shielding sheet 120, 220, or 320, but as shown in FIGS. 4 and 5, the circuit board 112 may have an area that is relatively narrower than an area of the magnetic shielding sheet 120, 220, or 320.

Accordingly, when the circuit board 112 is attached to one surface of the magnetic shielding sheet 120, 220, or 320 through the adhesive layer 116, the magnetic shielding sheet 120, 220, or 320 may completely cover an entire area of the circuit board 112.

Meanwhile, although not shown in the drawings, the antenna unit 110 may further include at least one another antenna (not shown) using a different frequency band from the wireless power transfer antenna 114 in addition to the at least one wireless power transfer antenna 114 for receiving or transmitting wireless power. As an example, the another antenna may be a near field communication (NFC) antenna or a magnetic secure transmission (MST) antenna.

The magnetic shielding sheet 120, 220, or 320 may be disposed on one surface of the antenna unit 110. The magnetic shielding sheet 120, 220, or 320 may increase condensing performance of a magnetic field by shielding a magnetic field generated in the antenna unit 110, thereby increasing performance of an antenna operated in a certain frequency band.

In this case, the magnetic shielding sheet 120, 220, and 320 may include the magnetic sheet 121 for shielding a magnetic field and the cover member 122 or 222 for covering an entire surface of the magnetic sheet 121.

Since contents of the magnetic shielding sheets 120, 220, and 320 are the same as those described above, detailed descriptions thereof will be omitted. In addition, in the drawing, the magnetic shielding sheet 320 of FIG. 3 is illustrated as being applied as a magnetic shielding sheet constituting the wireless power transfer module 100, but the present invention is not limited thereto. The magnetic shielding sheets 120 and 220 of FIGS. 1 and 2 may be applied.

The magnetic shielding sheets 120, 220, and 320 and the wireless power transfer module 100 may be applied to a Qi method or may be applied to wireless charging of a power matters alliance (PMA) method. In addition, the antenna unit 110 may include an alliance for wireless power (A4WP) method antenna operated in a magnetic resonance method as another antenna in addition to the wireless power transfer antenna 114 operated in a magnetic induction method.

In addition, the wireless power transfer module 100 may serve as a wireless power transmitting module or may also serve as a wireless power reception module.

Figure 7:
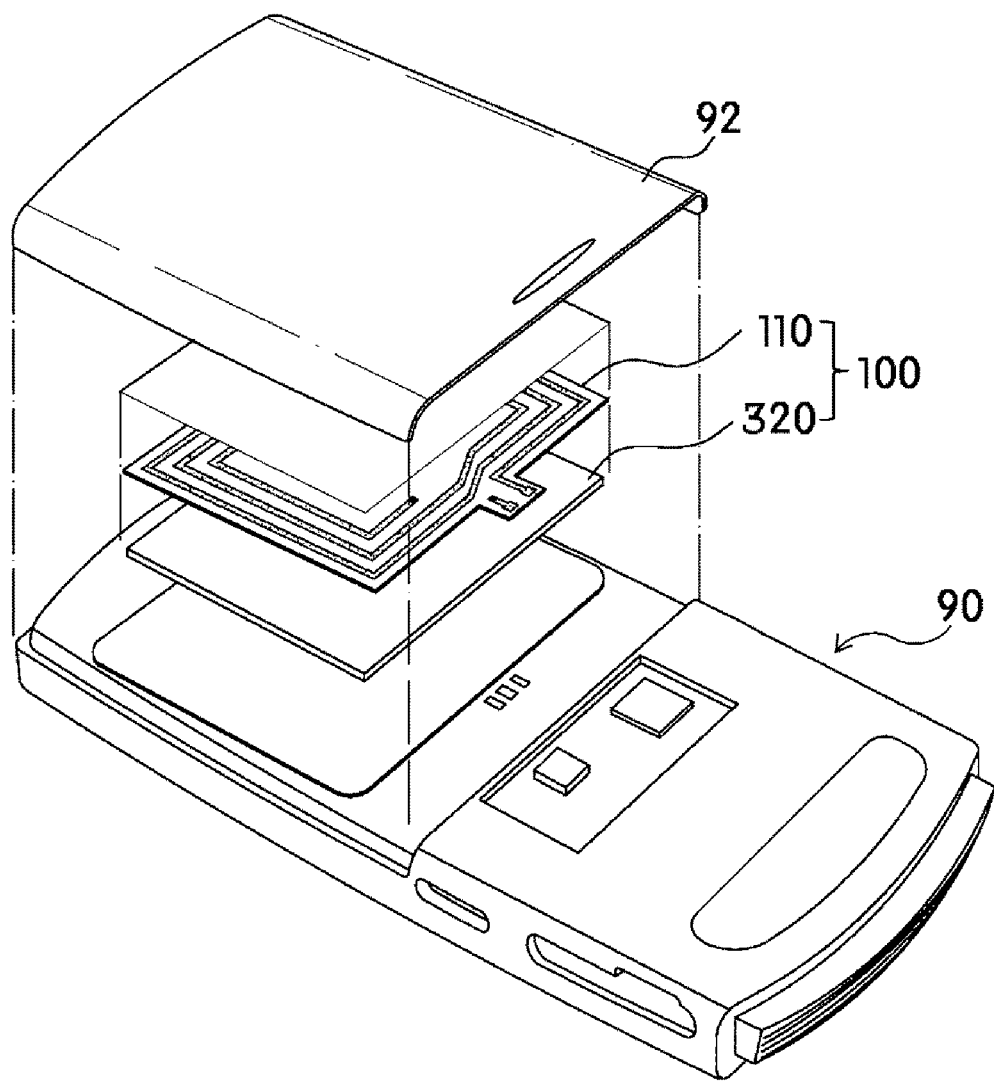
FIG. 7 is a view illustrating a state in which the wireless power transfer module according to one embodiment of the present invention is applied to a portable terminal.

As a specific example, when the wireless power transfer module 100 serves as the wireless power reception module, as shown in FIG. 7, the wireless power transfer module 100 may be attached to a back cover or rear case 92 of a main body 90 of a portable electronic device such as a portable terminal.

Meanwhile, although the ribbon sheet is described as the magnetic sheet 121 that is applicable to the present invention, the present invention is not limited thereto. Any material may be applied as long as the material includes a metal component such as silicon steel or a permalloy and also has magnetism.

While the embodiments of the present invention have been described above, the present invention is not limited to the embodiment presented herein. One skilled in the art may easily suggest other embodiments due to addition, modification, deletion, and the like of components within the scope and spirit of the present invention, and the addition, modification, deletion, and the like of the components fall within the scope and spirit of the present invention.

The invention claimed is:

1. A magnetic shielding sheet comprising:
   a magnetic sheet having a plate shape and made of a magnetic material including a metal component; and
   a cover member configured to cover an entire surface of the magnetic sheet to prevent the surface of the magnetic sheet from being externally exposed,
   wherein the magnetic sheet is a sheet which is flake-treated and divided into a plurality of fine pieces,
   wherein the plurality of fine pieces includes fine pieces having at least one side formed in a curved shape rather than a straight line, and
   wherein the number of the fine pieces having the at least one side formed in the curved shape is 50% or more of the total number of the plurality of fine pieces.

2. The magnetic shielding sheet of claim 1, wherein the cover member is a protective film.

3. The magnetic shielding sheet of claim 1, wherein the cover member includes a first cover member configured to cover an upper surface and side surfaces of the magnetic sheet and a second cover member configured to cover a lower surface of the magnetic sheet.

4. The magnetic shielding sheet of claim 1, wherein the magnetic sheet is a thin ribbon sheet including at least one selected from an amorphous alloy and a nano-crystalline alloy.

5. The magnetic shielding sheet of claim 4, wherein the magnetic sheet is a multilayer sheet in which a plurality of ribbon sheets are stacked as multiple layers through an adhesive layer.

6. The magnetic shielding sheet of claim 1, wherein the number of the fine pieces having the at least one side formed in the curved shape is 70% or more of the total number of the plurality of fine pieces.

7. A wireless power transfer module comprising:
an antenna unit including at least one wireless power transfer antenna for wireless power transmission; and
a magnetic shielding sheet attached to one surface of the antenna unit through an adhesive layer so as to shield a magnetic field generated in the antenna unit;
wherein the magnetic shielding sheet includes:
a magnetic sheet having a plate shape and made of a magnetic material including a metal component; and
a cover member configured to cover an entire surface of the magnetic sheet to prevent the surface of the magnetic sheet from being externally exposed,
wherein the magnetic sheet is a sheet which is flake-treated and divided into a plurality of fine pieces,
wherein the plurality of fine pieces includes fine pieces having at least one side formed in a curved shape rather than a straight line, and
wherein the number of the fine pieces having the at least one side formed in the curved shape is 50% or more of the total number of the plurality of fine pieces.

8. The wireless power transfer module of claim 7, wherein the wireless power transfer antenna is an antenna pattern patterned on at least one surface of a circuit board.

9. The wireless power transfer module of claim 8, wherein the magnetic shielding sheet has a size that is relatively greater than that of the circuit board.

10. The wireless power transfer module of claim 7, wherein the wireless power transfer module is a wireless power reception module embedded in a portable terminal.

11. The magnetic shielding sheet of claim 7, wherein the cover member is a protective film.

12. The magnetic shielding sheet of claim 7, wherein the cover member includes a first cover member configured to cover an upper surface and side surfaces of the magnetic sheet and a second cover member configured to cover a lower surface of the magnetic sheet.

13. The magnetic shielding sheet of claim 7, wherein the magnetic sheet is a thin ribbon sheet including at least one selected from an amorphous alloy and a nano-crystalline alloy.

14. The magnetic shielding sheet of claim 13, wherein the magnetic sheet is a multilayer sheet in which a plurality of ribbon sheets are stacked as multiple layers through an adhesive layer.

* * * * *